Oct. 20, 1931.    T. H. MORGAN    1,828,062

INDUCTIVE REACTIVE POWER COMPOUNDING

Filed Dec. 12, 1927    3 Sheets-Sheet 1

DIAGRAM OF CIRCUIT

VECTOR DIAGRAM

INVENTOR.
Theodore H. Morgan.
BY
Townsend, Loftus & Ablett
ATTORNEYS.

Oct. 20, 1931.  T. H. MORGAN  1,828,062

INDUCTIVE REACTIVE POWER COMPOUNDING

Filed Dec. 12, 1927  3 Sheets-Sheet 2

INVENTOR.
Theodore H. Morgan.
BY
Townsend, Loftus & Abbett
ATTORNEYS.

Oct. 20, 1931.  T. H. MORGAN  1,828,062
INDUCTIVE REACTIVE POWER COMPOUNDING
Filed Dec. 12, 1927  3 Sheets-Sheet 3
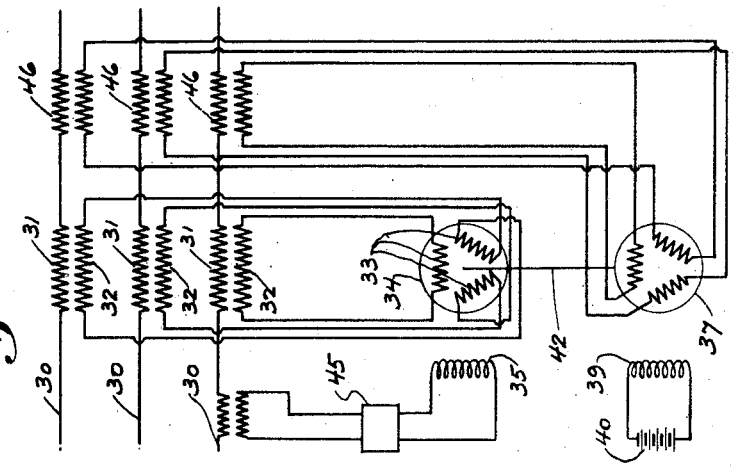
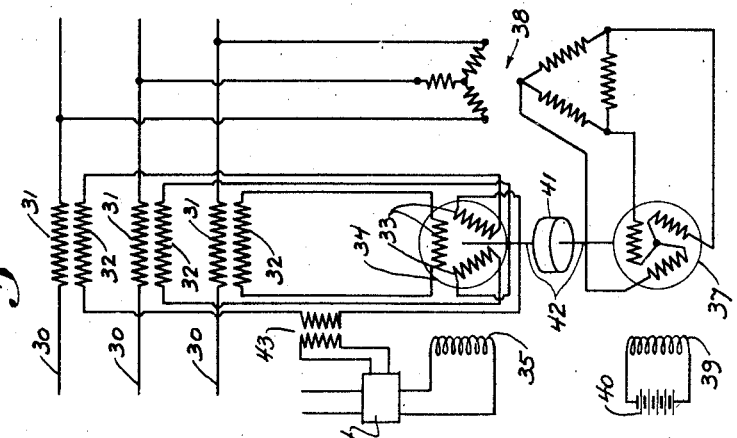
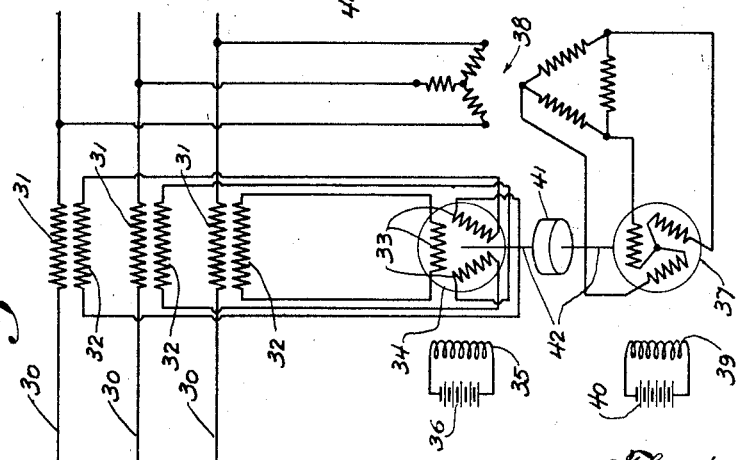
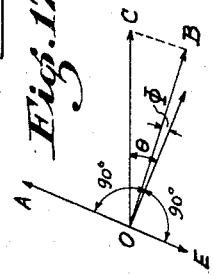
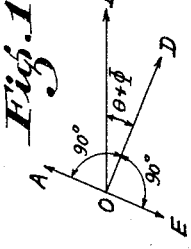
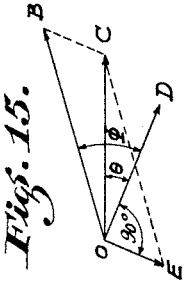
INVENTOR.
Theodore H. Morgan.
BY
ATTORNEYS.

Patented Oct. 20, 1931

1,828,062

UNITED STATES PATENT OFFICE

THEODORE H. MORGAN, OF PALO ALTO, CALIFORNIA

INDUCTIVE REACTIVE POWER COMPOUNDING

Application December 12, 1927. Serial No. 239,378.

My present invention relates to the regulation of electrical alternating current apparatus and transmission systems and more particularly to a method of regulation which I have termed inductive reactive power compounding.

The main object of my invention is to provide a method whereby the inductive reactance effects of a transmission line, or of any machinery or apparatus, may be wholly or partially compensated for in a direct manner.

Another object of my invention is to provide a method of compounding for the inductive reactive power of a transmission line or system and a method of operation thereof which will allow economical and efficient transmission of power over longer distances than has heretofore been practical.

A further object of my invention is to provide a transmission system of the above character from which power may be drawn or to which power may be supplied at any desired point along the line.

Another object of my invention is to provide a transmission system with means of regulation so that power lines may have a practically constant voltage at any desired point or points therealong; the voltage at these points being equal in both magnitude and phase relation to the voltage at any given desired point.

A further object of my invention is to provide in a transmission system, means whereby series voltages may be introduced into the system at various points along the power lines to maintain a required voltage at desired points therealong; it being possible to regulate this voltage both in magnitude and phase relation to any desired value within the limits of the apparatus.

Another object of my invention is to provide in a relatively high voltage transmission system, means of regulation so as to increase its power limit and insure characteristics of stability throughout the whole system under various conditions of loading.

A further object of my invention is to provide a method for supplying to a transmission system the inductive reactive power consumed by the system and the apparatus connectd there to so that the system will operate as if it contained no inductive reactance.

Another object of my invention is to provide in a transmission system, means of operation so that the power factor of the generators may be made equal or better than the power factor of the load by means other than by the use of synchronous condensers.

A further object of my invention is to provide a system of compensating for the inductive reactance effects of any electrical machinery or apparatus such as generators, transformers, motors, etc., so that such machinery or apparatus will operate with substantially no detrimental inductive reactance.

Another object of my invention is to provide a system wherein the above objects will be accomplished in a completely automatic manner.

The amount of alternating current power which can be transmitted from a point of generation to a point of consumption is in all cases limited by the inductive reactance of the transmission line, generators, transformers or other load machinery or apparatus. The entire inductive reactance between the actual point of generation of the internal voltage of the generator and the point of voltage drop due to power at the load, produces effects which limit the amount of power that can be transmitted between these two points.

In the prior art it has been proposed to employ synchronous condensers at substations near the receiving end of the transmission system for the purpose of regulating the voltage thereof. Under load conditions these synchronous condensers are operated overexcited and as a result draw a leading current from the line. The load current is normally lagging and when the synchronous condenser connected as above is over-excited a leading current will be taken thereby, which will be added to the lagging current and, as a result, the total line current will be shifted in phase relation with the voltage toward a leading position. Any shift of the phase relation of total current toward a leading position, as suggested above, will tend to raise the voltage of the system because the total current must flow through the line inductive reactance.

A recent development in the use of synchronous condensers for maintaining the stability of a transmission system is illustrated in U. S. Patent 1,617,007, granted February 8, 1927, to Frank G. Baum. In this patent it is proposed to not only operate the synchronous condensers at the load end of the line, but to place additional ones at intervals along the line and by this means hold the voltage constant at these intermediate points and at the receiving end.

Increasing the number of intermediate synchronous condensers along the transmission system as suggested by Baum in the above U. S. patent, will increase the amount of power which can be transmitted, but the voltage at the load and generator ends of the system will always be separated by some angular displacement as will be hereinafter pointed out. In addition to the above, there will always be an economic limit to the number of intermediate synchronous condenser substations which may be installed.

It has also long been recognized that static condensers of required rating connected in series in a power line would produce a voltage which would compensate for the voltage drop due to the inherent inductive reactance of the line, and that these static condensers might be in one unit connected at the generator or load end of the line, or at intermediate points therealong; or better conditions might be obtained by providing a number of static condensers in series distribution at intervals along the system.

This method of compensating for the voltage drop due to inductive reactance, while possible from a theoretical standpoint, is not practical in present transmission systems because of economical considerations, the low frequencies employed, and other reasons. It is conceivable, however, that if a voltage or voltages were introduced into a transmission line, similar in phase relation and magnitude to the voltage across static condensers, as suggested above, this voltage would accomplish a result similar to that obtained by such condensers and therefore the inductive reactance voltage drop of the line could be compensated for in part, wholly, or even over-compensated for, depending on the magnitude of the voltage thus introduced. Thus, as a result, not only could the inductive reactance voltages of the line be compensated for, but it would also be possible to compensate for similar quadrature reactance voltages of generators, transformers, or other machinery or apparatus connected to the line.

Basing my conclusions upon the above theory I propose to accomplish the same result as would be obtained with series condensers by providing a means for introducing a series voltage or a number of series voltages into the system which would have approximately the same characteristics as the voltage or voltages across static condensers, if they were connected where these series voltages are inserted. This inserted voltage or a number of voltages would be supplied to the line and in series with it by means of transformers designed for the purpose, or by connecting the machine directly in the line where the voltages are sufficiently low and present no difficult insulation problem.

For a better understanding of my invention, reference should be had to the drawings, in which—

Figs. 1, 2, 3, 4, and 5 are schematic and vector diagrams illustrating the fundamental principles involved in my invention.

Figs. 12, 13, and 14 are schematic wiring diagrams showing several aspects of my invention as applied to a three phase transmission system, and Figs. 15, 16 and 17 are vectorial representations showing values and displacement of the current and voltages as produced by my invention.

Figure 1:
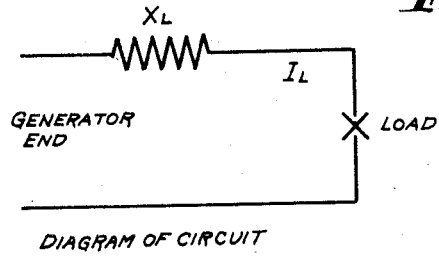
Figure 1:
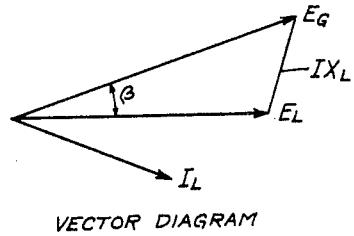
Figure 2:
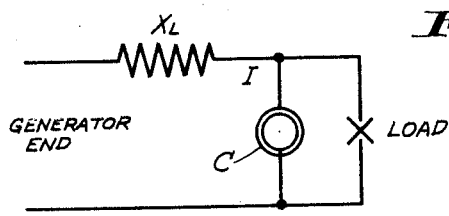
Figure 2:
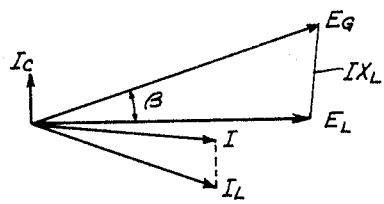
Figure 3:
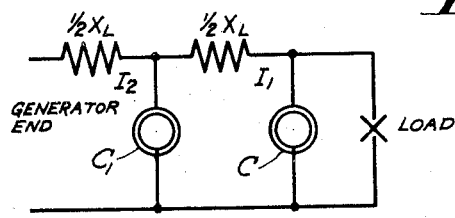
Figure 3:
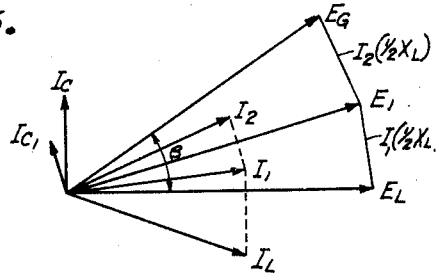

In order to illustrate and simplify an explanation of my invention, I have shown in Figs. 1, 2, and 3, schematic diagrams of simple circuits and adjacent thereto are shown vectorial representations of the relative values of voltage and current as well as their angular displacement with respect to each other.

In these diagrams the following designations are used;

$X_1$ = Inductive reactance of the circuit.
$E_g$ = Voltage at generator,
$E_1$ = Voltage at load end of line,
$I_1$ = Current flowing in line,
$I_c$ = Current drawn by synchronous condenser,
$I$ = Vector sum of $I_1$ and $I_c$,
$IX_1$ = Inductive reactance voltage drop in the line,
$C$ and $C_1$ = Condensers,
$IX_c$ = Voltage produced by C in opposition to the $IX_1$,
$E_2$ = Voltage of line at an intermediate point.

With the above in mind, it will be seen in Fig. 1, that I show a circuit which represents a transmission line, having an impedance of inductive reactance only and with no admittance between wires, having a load which draws a current $I_1$ lagging the voltage $E_1$ applied to it. It will also be seen that the voltage $E_1$ is less than the generator voltage $E_g$, and that the load voltage $E_1$ is displaced from the generator voltage $E_g$ by the angle $\beta$. These values, as is well known, are determined by the inductive reactance $X_1$ of the circuit. If a synchronuous condenser C is connected across the above circuit, as shown in Fig. 2, it will be possible to partially or completely compensate for the inductive reactance drop in the line and thus produce a condition on the line where the generator voltage $E_g$ and the voltage at the load $E_1$ will be equal in magnitude, but the voltages will still be displaced by the angle $\beta$. In this figure of the drawings, the synchronous condenser C is illustrated vectorially as drawing a leading current $I_c$ which in magnitude is not sufficient to fully compensate for the inductive reactance voltage drop $IX$, but it will be seen that, as a result of the leading current $I_c$, the voltage at the load end of the line $E_1$ has been increased so that it is nearly equal in magnitude to the generator voltage $E_g$. If the excitation of the synchronous condenser C is increased sufficiently, it can be made to completely or overly compensate for the inductive reactance drop so that the voltage $E_1$ at the load can be made equal to or greater than the voltage $E_g$ at the generator.

In Fig. 3, I show the same circuit as illustrated above with two synchronous condensers C and $C_1$ connected as disclosed in the above referred to Baum patent, the condenser C being located at the load end of the line and the condenser $C_1$ at an intermediate point along the line. In this diagram the synchronous condenser $C_1$ is located at a midpoint where the inductive reactance of the line is halved so that each condenser will compensate for an equal amount of the total inductive reactance drop $IX_1$ of the circuit. It should be pointed out here that the values represented are only approximate and can be considered as including the line capacitance if the line charging current is considered as a portion of the current $IC_1$ taken by the synchronous condenser $C_1$. From an inspection of the vector diagram, it will be seen that if the currents taken by the synchronous condensers C and $C_1$ are correct in value, the voltages $E_2$ and $E_1$ at these points can be made equal in magnitude to the voltage $E_g$ at the generator, as is more fully disclosed in the above cited patent to Baum. In connection with this diagram, attention is again directed to the fact that the voltages $E_g$ and $E_1$ are still angularly displaced from each other by the angle $\beta$.

Figure 4:
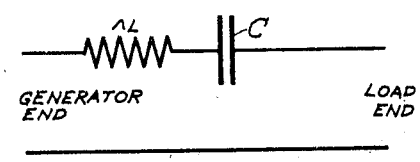
Figure 4:
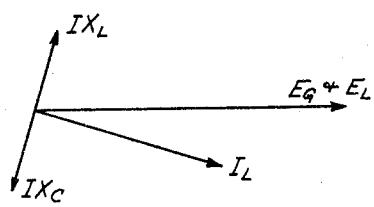
Figure 5:
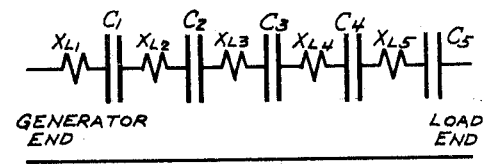
Figure 5:
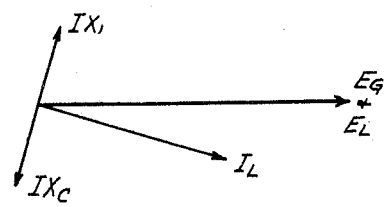

In Fig. 4, I show a single condenser C having a capacitive reactive effect $IX_c$ equal and in opposition to the inductive reactance drop $IX_1$ and, as a result, a voltage $E_1$ at the load end of the line is equal to the voltage $E_g$ at the generator. In connection with the vector diagram of this figure, it should be noted that the voltages $E_g$ and $E_1$ are not displaced, as in the former cases, by an angle $\beta$. Should the capacitive effect of the condenser C be distributed over the system, as shown in Fig. 5, by the use of a number of condensers, the results will be the same as above, the sum total of the inductive reactance of the line being compensated for by the combined effect of the separate condensers used.

From the foregoing it will be seen that my present invention resolves itself into the provision of a method and means for impressing a voltage or a number of voltages upon a transmission system which have approximately the same relation to the system as the voltage or voltages across the static condensers above mentioned, the voltage or number of voltages so provided being supplied to the system and in series with it. The supplied voltage or voltages are so generated and introduced into the system that they can be made to partially, entirely, or overly compensate for the inductive reactance effects of the line; or it might only be made to compensate for the inductive reactance voltage of one or more pieces of machinery such as a generator, transformer, or both.

In carrying out the above, the supplied or impressed voltage or voltages should be at a leading phase angle of 90° to the line current so that the combined effect would be reactive power. The reactive power supplied, however, in this case would be approximately equal to and directly opposed to the inherent inductive reactive power of the transmission line or machinery for which it is compensating so that the operation can rightly be called "Inductive reactive power compounding."

So far as applicant is aware, this method is entirely new and different from any previous method of line or machinery operation. Previous methods have suggested placing synchronous condensers across the line which hold the voltage constant by drawing either a leading or lagging current from the line. These synchronous condensers are connected in parallel across the line similar to a load and the desired voltage is obtained by drawing a leading or lagging current by the synchronous condenser, thus altering the total line current to the necessary value to obtain the voltage desired, arriving at the result because of the magnitude and phase relation of the total current flowing through the reactance of the line. In other words the required voltage at any point is obtained by producing a reactance voltage between the generator and this point, which is of such magnitude and phase relation to the generated voltage that it gives the required voltage at the point considered.

There are certain requirements which must be satisfied with respect to the voltage, or voltages which are to be introduced into the line in accordance with my invention to compensate for the reactance of the line or machinery. The inserted voltage or voltages, as the case may be, must be at the same frequency as that of the line and it should be kept at a leading phase angle of approximately 90° to the current in the line at the point at which it is introduced. These conditions will make it approximately a non-power voltage, compensating for the voltage due to the inherent inductive effects of the line, which is similar, but in the opposite direction.

Figure 6:
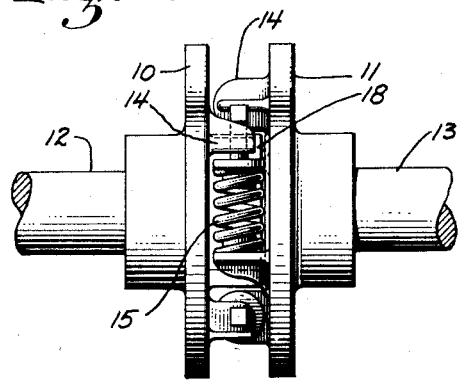
Figs. 6 and 7 illustrate a yielding shaft coupling which will permit angular displacement between the rotor of the driving motor and the rotor of a connected generator.
Figure 7:
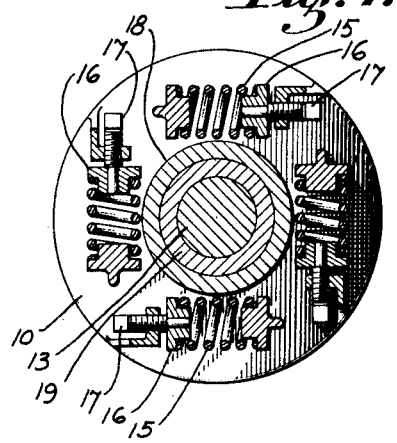

It is possible that the above requirements may be satisfied by various methods and specialized apparatus. In the following description I am describing by way of illustration such methods and apparatus as now seems to me to represent the best embodiment thereof. With respect to the mechanical features of my invention, I have illustrated on Sheet 2 of the drawings, several modifications thereof. In Figs. 6 and 7, I show a yielding coupling member which will permit a limited amount of angular displacement between the rotors of two machines when connected through this coupling. The coupling comprises co-acting flanges 10 and 11 which are secured respectively to the ends of shafts 12 and 13. The flanges 10 and 11 are provided with extending shoulders 14 which overlap and arranged between these shoulders I show a yielding means in the form of a spring 15 which will be compressed as the torque exerted through the coupling is increased. In order that the range of displacement of this coupler may be varied, I have provided a movable seat 16 at one end of each of the springs 15 and a screw 17, by means of which the initial compression of the springs 15 may be varied. In order to maintain the flanges 10 and 11 in axial alignment, I provide upon the flange 10 a concentric collar 18 which extends over a similar collar 19 upon the flange 11.

In its application, this coupler will be connected between a synchronous driving motor and a reactive power compensating generator and will operate in a manner to be hereinafter more fully described.

The provision of this type of coupler is to permit a limited amount of angular displacement between the rotors of the two machines. In operation the synchronous motor, by reason of its nature, will maintain its rotor at a constant phase angle with respect to the voltage applied to it, and since it is desired to generate a voltage which is counter to the reactive voltage of the line, which value varies with the current, it will only be necessary to provide a means whereby the rotor of the compensating generator can move angularly with respect thereto to produce the proper phase angle of generated voltage, which angle should then be 90° ahead or leading with respect to the line current. In designing a generator of this type, the windings will be so arranged that the additional movement involving this coupler will be reduced to a minimum.

Figure 8:
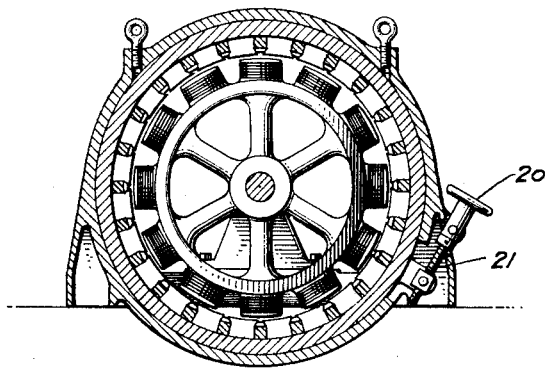
Fig. 8 is a sectional view of a generator having manual means for adjusting the relative position of its stator winding with respect to the rotor.
Figure 9:
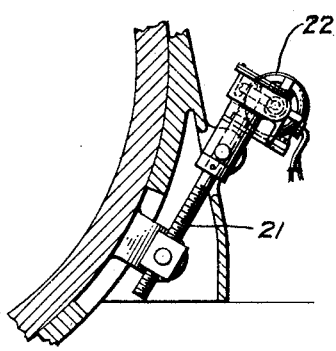
Fig. 9 is a fragmentary view of the generator shown in Fig. 8, showing the application of a motor for automatically adjusting the position of the stator.
Figure 10:
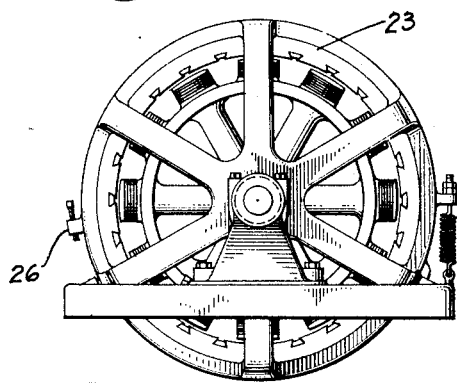
Figs. 10 and 11 show respectively an end elevation and a horizontal sectional view of a generator similar to that shown in Fig. 8, wherein the stator is yieldingly mounted so that it can automatically assume a position with respect to the rotor as required in its application to a system involving my invention.
Figure 11:
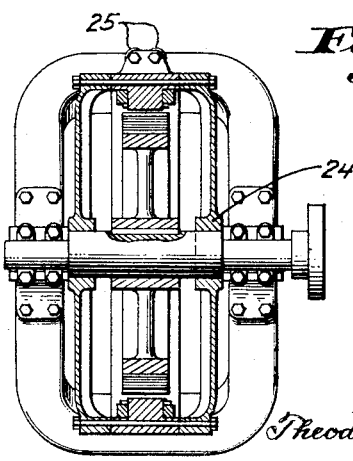

In order to accomplish this same result without resort to a yielding coupling of the above type, means may be provided, as shown in Figs. 8 and 9, whereby the stator of the generator can be moved angularly with respect to the stator of the motor, either by manual means such as the hand wheel 20 and screw 21 of Fig. 8, or automatically by means of the motor 22 and screw 21 of Fig. 9. By such a construction, it will be possible to accomplish the same result as that suggested above as the rotors of the motor and generator will be fixed with relation to each other and it will then be the stators of these machines which will be angularly displaced with respect to each other, either method of which will obviously accomplish the same result. If the apparatus of Fig. 9 is used, it will be possible to control the position of the stator of the generator automatically by providing electro-magnetic control means connected to the line circuit for controlling the operation of the motor 22.

Should it be desired to adopt the features of design illustrated in Figs. 8 or 9, it might be possible to accomplish the same result in a manner similar to the action of the yielding coupling by eliminating the screw 21 and so mounting the stator that it will be free to turn under the influence of the magnetic field attraction which will be determined by the power being generated thereby, and, as a result, the stator will assume an angle and produce a phase displacement of the generated current which will be proper with respect to the line current. This can be accomplished by providing a stator 23 having bearings 24, whereby it may be turned concentrically with the rotor in opposition to a yielding means which, in the present instance, is shown as a spring 25. The tension of the spring 25 is made adjustable and a stop 26 is provided to limit the movement of the stator.

Having now described the principles of operation and various aspects of the apparatus involved, I shall proceed with the description of my invention by describing its application and operation upon a three phase transmission line.

In Figs. 12, 13, and 14 of the drawings, I show diagrammatic lay-outs of systems wherein the inherent inductive reactance of a three phase line is compensated for in accordance with preferred embodiments of my invention. It should be pointed out here that, while I have illustrated three distinct methods of control for the generators, each system will operate on the same principle and only one such group will be necessary at the point where inductive reactive compensation is required, it being understood, however, that a complete transmission system may require several such groups of apparatus distributed along the system at various points as the condition of its load may require. In each of these lay-outs, the various machines will be of a similar nature, but their individual characteristics may be changed as required by the particular conditions existing at the point of their application.

In Fig. 12 I have designated the three power lines of a three phase transmission by the numeral 30 and connected in each line in series therewith, I show regular windings 31 of suitable transformers. Associated with each of the windings 31 I provide other windings 32 that are directly connected to windings 33 of a machine 34, which, for want of a better name, I shall hereinafter refer to as an "inductive compensating generator". The windings 33 may be wound upon the stator or rotor of this generator. For purposes of illustration I have shown the windings 33 as mounted upon the rotor of the generator 34 and adapted to rotate within a field set up by a winding 35 arranged upon the stator of the generator. It should be understood that the location of these windings may be interchanged without affecting the operation thereof. The winding 35 is shown in the drawings as being excited by a suitable source of current such as a battery 36. A synchronous motor 37 is shown connected to the power lines 30 through a transformer 38 in the usual manner and it has a field winding 39 which is excited by means of a battery or other source of current 40. The inductive compensating generator 34 is shown as connected to and driven by the synchronous motor 37 by means of a shaft 42 and through a yielding coupling 41, such as is illustrated in Figs. 6 and 7 of the drawings. As a result of the yielding coupling 41, the positions of the rotors of these machines will automatically change in their angular displacement with respect to each other so that the phase angle of the induced voltage will be automatically adjusted to meet changing values of the power factor. This result may also be accomplished by the application of either of the other methods previously suggested for attaining an angular adjustment of the phase angle of the compensating generator voltage. The coupling 41 may also be of a non-yielding or rigid type if means are provided therewith, whereby the coupling may be adjusted to a definite position when the machines are not in operation.

This latter method of adjusting the phase angle of the compensating generator with respect to the line current will be found perfectly satisfactory where the phase angle or power factor of the line current is constant, but where the power factor is constantly changing, it will be more desirable to adopt one of the automatically adjustable means previously mentioned. The power factor of the transmission line might be maintained constant by using the driving synchronous motor 37 of the above combination or another synchronous motor or condenser for this purpose, which would hold the line power factor constant at the point where compensating voltage is being introduced into the system.

The compensating voltage to be inserted into the line can be maintained at the required value by adjustment of the direct current in the field winding 35 of the generator 34. The magnitude of this voltage should be proportional to the current flowing in the line and this voltage can therefore be adjusted automatically by field control apparatus responsive to the line current.

The phase angle of the compensating voltage to be inserted into the line should, as previously stated, be held approximately at a leading phase angle of 90° to the line current. This can be automatically accomplished by adjustment of the relative position of the stators or rotors of the two machines by the methods suggested above, or by setting the generator phase angle properly and holding the line power factor constant, as is also previously suggested. All of these operations can be made completely automatic by the provision of apparatus which will operate in response to the line current.

In Fig. 13, I have shown a schematic diagram of a system similar to that of Fig. 12 with the additional feature of automatic regulation of the field of the compensating generator. In addition to the apparatus already described in connection with Fig. 12, I show a current transformer 43 connected in the circuit of one phase of the compensating generator which supplies controlling current to a field regulating device 44 connected in the circuit of the generator field 35. The regulator 44 can be of any well known type and will control the excitation of the field winding 35 in response to changes in the compensating generator or line current.

As a further modification in automatic regulation, it is proposed to place a rectifier in the position occupied by the field regulating device 44. Such a rectifier can be connected to the generator circuit, as shown by the transformer 43, or this transformer might be connected to the transmission wires 30 of the transmission system. Under these conditions the main line current will be rectified and used for exciting the field of the inductive compensating generator. This might be done by the use of a current transformer connected as above and properly designed mercury arc rectifier or rectifying commutators. This would give very good automatic regulation of the magnitude of the voltage of the inductive compensating generator, since this voltage should always be proportional to the current in the line. The mechanical phase of the driving motor or generator would then be adjusted to correspond with any phase shift that occurred in the line current with respect to its voltage. This latter adjustment can be automatically arranged for by any of the methods previously suggested.

In Fig. 14, in addition to the feature of automatic field control, I show an arrangement wherein account is also taken of the fact that the motor 37 driving the compensating generator 34 will only be required to supply some of the losses of this generator. In view of this fact, it is proposed to connect the motor 37 in series with the transmission line by the use of another set of series transformers 46 which will be connected in the line in a manner similar to the transformers used in connection with the inductive compensating generator. The transformer bank connected across the line as a source of power for the motor, previously described, will be eliminated. With such an arrangement, the mechanical angular position of the driving motor would be held at a fixed angle with respect to the line current, and, consequently, after the position of the rotor of the inductive compensating generator had once been properly established, it would hold its required position and there would be no need for angular mechanical adjusting means as previously described. This system of connection will be possible in the present instance as the load imposed upon the motor 37 is light.

The inductive compensating generator will only be required to be of such a size that its KVA rating will be the same as the inductive reactive power consumed by the transmission line or piece of machinery with which it is being used. This will be equal to $I^2X$, where I is the current and X the inductive reactance of the line or piece of machinery.

The problem of inserting the voltages into a high voltage circuit can be taken care of by using suitably designed transformers connected in series with the line, as shown in Figs. 12, 13, and 14, and connecting the other windings of these transformers directly to the separate phases of the machine supplying the compensating voltage.

In such an arrangement as shown, the ampere-turns of the transformer windings will be equal and the current will flow through the armature winding of the generator 34. Where the voltage of the system is sufficiently low, the power lines can be connected directly to the different phase windings of the generator 34, thus eliminating the use of the transformers.

The principle of "inductive reactive power compounding", when applied to an alternating current generator, will make it possible to produce a line voltage external to the alternator which is equal in magnitude and phase relation to the internal voltage generated in its armature winding, i. e., it can be made to completely compensate for the inductive reactance voltage drop within the machine. Such operation with an alternating current generator would not necessarily require the use of a synchronous motor to drive the machine supplying the reactive power which gives the compounding. In this instance the compounding machine might be connected to the shaft of the prime mover and any of the methods suggested above used for adjustment of its voltage in magnitude and phase angle.

In order to explain the operation of my invention, I have illustrated in Figs. 15, 16, and 17, vectorial representations showing the values of voltage and current together with their phase displacement, referring particularly to Fig. 15 and assuming a load at the end of the transmission line, which may be represented by the current vector OD and voltage vector OC, with the power factor of this load equal to the cosine $\theta$. Suppose that the line has inductive reactance so that the voltage OE is induced in the line when the current OD flows through it. Then the voltage at the generator end will be OB and the power factor at the generator end will be cosine $\phi$. Neglecting the effect of line capacitance and resistance, this would represent conditions on a transmission line without inductive reactive power compounding.

By changing the relative positions of the rotors or stators of the driving motor and compensating generator automatically or by hand adjustment so that the generator 34 will cause a voltage having the phase position OA, as shown in Fig. 16, to be inserted through the transformer upon the line in series with it, a compensating voltage can be impressed upon the line which will have a phase angle in direct opposition to the vector OE, and by controlling the magnitude of the voltage OA automatically or by hand, as previously suggested by changing the amount of the field current in the winding 35, the voltage OA can be made equal in magnitude to the voltage OE. Under these conditions the voltage at the load will be the vector sum of OB, OE, and OA, or in other words, OB. From this figure of the drawings, it will be seen that the generator voltage and the voltage at the end of the line are equal, there being no change in the power factor of the load, and that the power factor of the generator has now become the power factor of the load.

If OA maintains its same phase relation with respect to OD, but is still further increased by reason of an increase of field current through the winding 35, we will have conditions as shown by the diagram of Fig. 17. The voltage at the load will, as in the previous example, be the vector sum of OB, OE, and OA, which is OC. The power factor of the load will be cos $\theta$, as before, but the power factor of the generator will become cos $\phi$, which approaches unity in the case shown.

From the above it will be noted that accompanying the improvement in generator end power factor, we also get an increase in load end voltage, when the generator end voltage remains constant.

Methods other than those shown of deriving the voltage to be inserted into the line, and of inserting it into the line, may be used. It is believed, however, that the general method of compounding for inherent inductive reactive power by introducing a series voltage into a circuit has never before been used and is therefore patentable. It may also be possible to employ other methods than those suggested of controlling the amount and phase angle of the compounding voltage.

One variation from the apparatus shown is in connection with the yielding coupling shown in Figs. 6 and 7, where, instead of providing the springs 15, resort may be had to a simple friction clutch which would only transmit sufficient torque to drive the inductive compensating generator. This would permit the rotors of the synchronous motor and the compensating generator to assume their proper positions with respect to each other without having to overcome the tension introduced in compressing the spring.

While I show a method of compensating for inherent inductive reactance effects in a three phase line, it should be clearly understood that no limitations are intended as to the number of phases, of form of line, machinery, or apparatus, to which the general method may be applied, and that regulation may be obtained by a combination of any or all of these proposed methods, and that inductive reactance power compounding may be applied to an alternator, a transformer, a motor, or to a power transmission line. In the latter case it may be applied at either end, at both ends, or at any number of points desired.

Having thus described my invention, what I claim and desire to secure by Letters Patent is—

1. A system of power transmission comprising a transmission line, a source of energy connected thereto, a synchronous motor connected to the line at a point remote from said source, and means including a generator having its phase windings connected in series relation with said line and driven by said synchronous motor, said generator being arranged and connected so as to introduce an electro-motive force equal in phase relation to the reactance drop into said line at a point remote from said source to thereby increase the power limit of the system.

2. A system of power transmission comprising a transmission line, a source of energy connected thereto, a synchronous motor connected to the line at a point remote from said source, a generator adapted to be driven by said synchronous motor having its windings connected in series relation with said line at a point remote from said source, and means whereby the phase relation of said generator voltage can be varied in response to changes in the line current whereby said generator will develop a voltage substantially equal in magnitude and phase relation to the voltage drop due to reactance of the line to thereby increase the power limit of the system.

3. The combination with a synchronous motor of a dynamo electric machine so arranged, connected and driven as to develop an electro-motive force substantially 90° leading and proportional to the currents flowing therethrough, said dynamo machine being connected in series circuit relation to a transmission system at a point remote from the source to overcome the voltage drop due to reactance in said system, variable excitation means for said dynamo electric machine, and current responsive regulating means for changing the excitation of said dynamo electric machine in response to changes of current in said transmission system.

4. The combination with a synchronous motor of a dynamo electric machine having its windings connected in series relation with a transmission system, a mechanical connection between said synchronous motor and said dynamo electric machine adapted to yield and permit angular displacement of the rotors of the two machines with respect to each other whereby the phase displacement of the electro-motive force of said dynamo electric machine with respect to said transmission system may vary and cause an electro-motive force having a leading phase angle of 90° to be introduced into said system to thereby compensate for the voltage drop due to reactance therein.

5. A system of power transmission comprising a transmission line, a source of energy connected thereto, a synchronous motor connected in series relation with said line, a generator arranged, connected and driven so as to be capable of developing a substantially 90° leading electro-motive force having its windings connected in series with said line at a point remote from said source, and means for varying the excitation of said generator in proportion to the current flowing in said line whereby an electro-motive force will be introduced into said system to compensate for the inductive reactance thereof.

6. A system of power transmission comprising a transmission line, a source of energy connected thereto, a synchronous motor connected in series relation with said line, a generator arranged, connected and driven so as to be capable of developing a substantially 90° leading electro-motive force having its windings connected in series relation with said line at a point remote from said source, and a rectifier connected to said line and adapted to provide excitation for said generator proportional to the current flowing in said line, whereby an electro-motive force of the proper phase angle and magnitude will be introduced into said system to compensate for the inductive reactance thereof.

7. A system of power transmission comprising a transmission line, a source of energy connected thereto, a synchronous motor connected to said transmission line, a generator having its windings connected in series relation with said line driven by said synchronous motor, means for controlling the excitation of said generator to maintain its electro-motive force proportional to the current flowing in said line, and mechanical means interposed in the driving connection between said synchronous motor and said generator for maintaining the electro-motive force of said generator at a leading angle of 90° to the current flowing in said line.

8. A system of power transmission comprising a transmission line, a source of energy connected thereto, a synchronously driven generator arranged, connected and driven so as to be capable of developing an electromotive force equal in magnitude and phase relation to the reactance drop of said line, said generator being connected in series relation with said line at a point remote from said source and adapted to introduce its electro-motive force therein to increase the stability of the system at this point.

9. In a system of power transmission the combination of a transmission line, a source of energy connected thereto, a means for generating a second electro-motive force connected in series circuit to said line at a point remote from said first source arranged, connected and driven so that it is capable of generating an electro-motive force 90° leading and proportional to the current flowing through said line, and a rectifier connected between said transmission line and the field of said second source of electro-motive force whereby the electro-motive force introduced by said second source will be maintained proportional to the current flowing in said line.

10. In a system of alternating power transmission having the usual sources of energy connected thereto, a dynamo electric machine connected in series circuit relation with said transmission system at a point remote from said sources of energy, and means whereby the phase displacement of the electro-motive force introduced into said transmission system by said dynamo electric machine will be maintained equal in magnitude and phase relation to the reactance drop in said line to thereby increase the power limit of the system.

11. In a power transmission system, a plurality of conductors, a source of energy associated with said conductors, a synchronous motor adapted to drive a generator associated with said conductors at a point remote from said source of energy and intermediate the ends of said conductors, a generator having the out-put thereof in series relation with said conductors, and means associated with said synchronous motor and said generator for maintaining the electro-motive force at a leading angle of 90° to the current flowing in said conductors.

THEODORE H. MORGAN.